April 3, 1928.  1,665,178
P. RYAN
ATTACHMENT FOR CULTIVATORS OR PLOWS
Filed Dec. 18, 1925
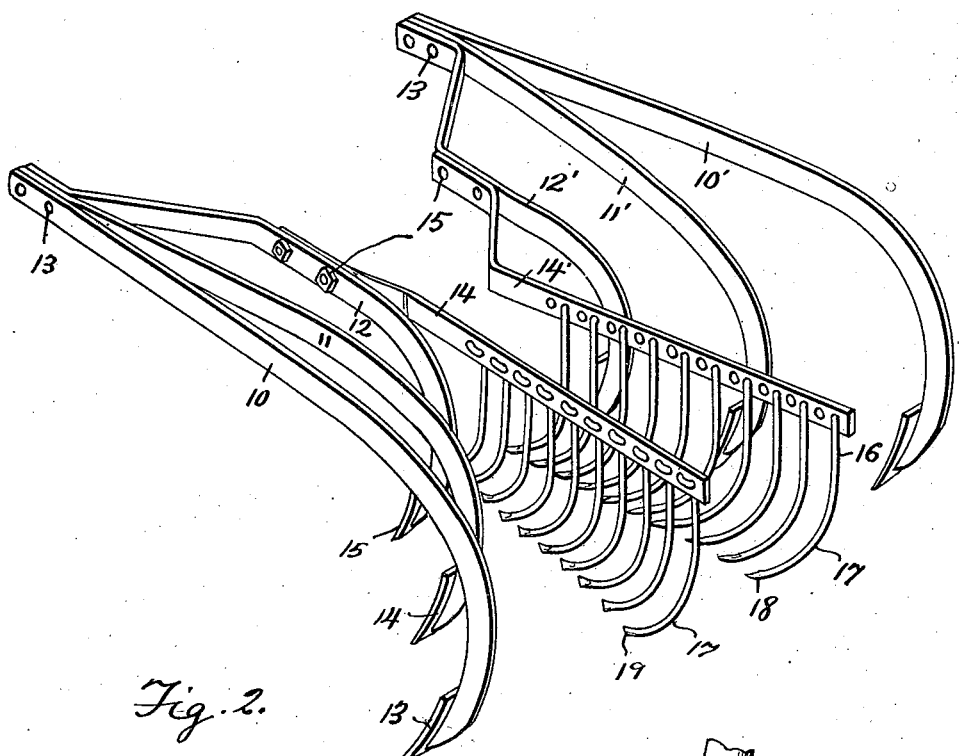
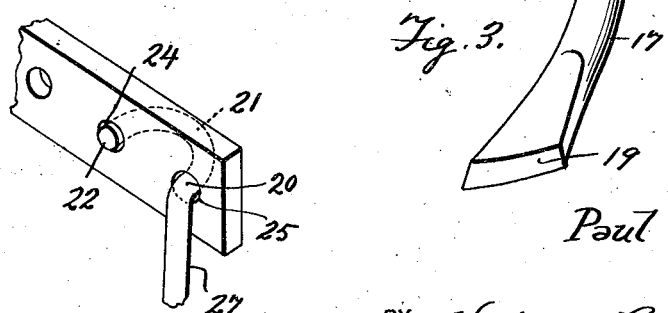
INVENTOR
Paul Ryan
BY *Victor J. Evans*  ATTORNEY Patented Apr. 3, 1928.

1,665,178

UNITED STATES PATENT OFFICE.

PAUL RYAN, OF DAKOTA CITY, NEBRASKA.

ATTACHMENT FOR CULTIVATORS OR PLOWS.

Application filed December 18, 1925. Serial No. 76,318.

The object of this invention is to provide a fender attachment of particular construction for connection with the gangs frame of a cultivator, for the purpose of raising the leaves of corn stalks, placing soil around the hills, and removing weeds or lime growing between the rows.

A further object is to effect this result by providing an attachment or attachments each including a bar connected at the forward end with a cultivator gang frame or plow beam, said bar having secured thereto a row of prongs or teeth, curved in a particular manner, and mounted as described below.

With the foregoing and other objects in view, the invention consists in the novel construction and arrangement of elements described, illustrated and claimed, it being understood that modifications may be made within the scope of the claims, without departing from the spirit of the invention.

In the drawings forming a part of this application,

Figure 1 is a view in perspective, showing the fender attachment connected with the cultivator gang frames.

Figure 2 is a detail in perspective, showing the manner of connecting the upper end of one of the prongs or teeth with the horizontal bar provided for mounting the rows of teeth illustrated in Figure 1.

Fig. 3 is a perspective view of the ground engaging portion of a prong.

The gang frame on each side of the machine includes the bars or beams 10, 11 and 12, and these beams carry blades 13, 14 and 15, which may be of any standard form or construction. The gang on the other side of the machine is of similar construction and includes the beam 10', 11' and 12'. These elements last named are connected by means of bolts 13, at their forward ends, and the beams 10, 11 and 12 are similarly connected by bolts 13, or by means of rivets, if preferred.

The fender attachment on each side, that is the attachment for each gang frame, includes a bar, such as element 14 or 14', these devices being offset from the elements 12 and 12', and being secured at 15, in an obvious manner.

Bars 14 and 14' are apertured, two apertures being provided for each prong or tooth, and these elements last named each includes a main shank portion 16, a lower curved portion 17, and a laterally extending portion 18, which is flattened and preferably formed as shown, that is having the extreme end cutaway at an angle, and if desired having the edge 19 bevelled.

The prongs are curved in the same direction, that is those mounted on bar 14 are curved in the same direction as those mounted on bar 14', and each prong or tooth includes an upper end portion deflected or bent at 20, curved at 21, and having an end portion 22 projecting thru an aperture 24 adjacent to aperture 25 thru which the portion 20 first named extends. In view of this arrangement, the upper offset end, or offset portion of each prong, passes thru the bar 14 or 14', in reverse direction, and the extreme end 22 is headed or otherwise secured in opening 24, so that the prongs are not only braced in view of contact with the sides of the bars, at the points 27, but the upper portions are firmly secured in such manner that they cannot be detached by accident.

Having thus described the invention, what is claimed as new, is:

The combination with a bar for connection with a cultivator gang frame, said bar being apertured transversely, of a prong including a vertical shank portion, the upper part of which is adapted to engage the side of the bar, said prong being offset above the part thus engaging the bar, and the offset portion extending horizontally thru the bar at a right angle with the vertical portion of the shank and being of U-form, the extreme end projecting thru the bar and an aperture therein, in a direction opposite to that first engaged by the offset portion, in the same horizontal and said extreme end being headed in the apertured portion thru which it passes, the headed portion and the upper part of the shank engaging the bar on the frame side thereof.

In testimony whereof I affix my signature.

PAUL RYAN.